(12) United States Patent
Shi et al.

(10) Patent No.: US 11,681,407 B2
(45) Date of Patent: Jun. 20, 2023

(54) TOUCH SUBSTRATE HAVING LAYERS WITH VARYING REFRACTIVE INDEX, TOUCH DISPLAYING DEVICE, AND MANUFACTURING METHOD OF TOUCH SUBSTRATE

(71) Applicants: Wuhan BOE Optoelectronics Technology Co., Ltd., Hubei (CN); BOE Technology Group Co., Ltd., Beijing (CN)

(72) Inventors: Xia Shi, Beijing (CN); Yuanhui Guo, Beijing (CN); Jie Han, Beijing (CN); Jian Zhao, Beijing (CN); Peipei Zhang, Beijing (CN); Yujie Gao, Beijing (CN)

(73) Assignees: WUHAN BOE OPTOELECTRONICS CO., LTD., Hubei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/350,192

(22) Filed: Jun. 17, 2021

(65) Prior Publication Data

US 2022/0155894 A1 May 19, 2022

(30) Foreign Application Priority Data

Nov. 18, 2020 (CN) .......................... 202011300620.9

(51) Int. Cl.
*G06F 3/046* (2006.01)
*G06F 3/041* (2006.01)

(52) U.S. Cl.
CPC ............ *G06F 3/046* (2013.01); *G06F 3/0412* (2013.01); *G06F 2203/04103* (2013.01)

(58) Field of Classification Search
CPC .................. G06F 3/046; G06F 3/0412; G06F 2203/04103
See application file for complete search history.

(56) References Cited

U.S. PATENT DOCUMENTS

| | | | |
|---|---|---|---|
| 2013/0169597 A1* | 7/2013 | Yin ........................ | G06F 3/0446 345/175 |
| 2016/0274695 A1* | 9/2016 | Ando ..................... | G02B 1/113 |
| 2017/0357348 A1* | 12/2017 | Lee .......................... | G02B 1/14 |

\* cited by examiner

*Primary Examiner* — Lisa S Landis
(74) *Attorney, Agent, or Firm* — WHDA, LLP (57) ABSTRACT

A manufacturing method of a touch substrate, a touch substrate, and a touch displaying device. The touch substrate comprises a base plate and touch electrodes, wherein a first film layer, a second film layer and a third film layer are sequentially stacked on one side of the base plate, and the refractive index of the second film layer is smaller than that of the first film layer and the third film layer.

11 Claims, 4 Drawing Sheets

TOUCH SUBSTRATE HAVING LAYERS WITH VARYING REFRACTIVE INDEX, TOUCH DISPLAYING DEVICE, AND MANUFACTURING METHOD OF TOUCH SUBSTRATE

CROSS REFERENCE TO RELEVANT DISCLOSURES

The disclosure claims priority to Chinese Patent Disclosure No. 202011300620.9, entitled "Manufacturing Method of Touch Substrate, Touch Substrate, and Touch Displaying Device", filed with the China National Intellectual Property Administration on Nov. 18, 2020, which is incorporated herein by reference in its entirety.

TECHNICAL FIELD

The disclosure relates to the technical field of display, in particular to a manufacturing method of a touch substrate, a touch substrate, and a touch displaying device.

BACKGROUND

With the development of the touch technology, touch panels, as the core component of human-computer interaction systems, have been widely applied to various digital information display systems to meet people's requirements for information exchange and user experience.

SUMMARY

The embodiments of the disclosure provide a manufacturing method of a touch substrate, a touch substrate, and a touch displaying device.

The embodiments of the disclosure disclose a touch substrate, wherein the touch substrate comprises a base plate and touch electrodes;

wherein a first film layer, a second film layer and a third film layer are sequentially stacked on one side of the base plate, and the refractive index of the second film layer is smaller than that of the first film layer and the third film layer.

Optionally, wherein the first film layer, the second film layer and the third film layer are all made of insulating materials, and the touch electrodes comprise: a first touch electrode disposed between the first film layer and the second film layer, and a second touch electrode disposed between the second film layer and the third film layer.

Optionally, wherein the first touch electrode and the second touch electrode are crossed to form metal grids.

Optionally, wherein the first touch electrode is a drive electrode, and the second touch electrode is an induction electrode; or, the first touch electrode is an induction electrode, and the second touch electrode is a drive electrode.

Optionally, wherein the touch electrodes comprise a first touch electrode and a second touch electrode that are disposed on a side, backing onto the first film layer, of the base plate, the second touch electrode is disposed on a side, backing onto the base plate, of the first touch electrode; the touch substrate further comprises:

a first insulating layer disposed between the base plate and the first touch electrode;

a second insulating layer disposed between the first touch electrode and the second touch electrode; and a third insulating layer disposed on a side, backing onto the base plate, of the second touch electrode.

Optionally, the touch substrate further comprising: a fourth film layer, a fifth film layer and a sixth film layer that are stacked on a side, backing onto the first film layer, of the base plate, wherein the fourth film layer is disposed close to the base plate, the fifth film layer is disposed between the fourth film layer and the sixth film layer, and a refractive index of the fifth film layer is smaller than that of the fourth film layer and the sixth film layer.

Optionally, wherein the fourth film layer, the fifth film layer and the sixth film layer are all made of insulating materials, and the touch electrodes comprise: a first touch electrode disposed between the fifth film layer and the fifth film layer, and a second touch electrode disposed between the fifth film layer and the sixth film layer.

Optionally, wherein the first film layer and the third film layer are made of at least one of titanium dioxide and niobium oxide, and the second film layer is made of at least one of silicon dioxide and magnesium fluoride.

Optionally, wherein the first film layer and the third film layer are made of titanium dioxide, the second film layer is made of silicon dioxide, the thickness of the first film layer and the thickness of the third film layer are 113 nm, the thickness of the second film layer is 97 nm.

A touch displaying device, comprising a display panel, and a touch substrate, wherein the touch substrate is located on a light emitting side of the display panel.

Optionally, wherein the display panel is located on the side, backing onto the first film layer, of the base plate.

Optionally, wherein the touch substrate and the display panel are bonded with an optically clear adhesive.

A manufacturing method of a touch substrate, wherein the touch substrate comprises a base plate and touch electrodes, and the manufacturing method comprises:

providing the base plate; and sequentially forming a first film layer, a second film layer and a third film layer on a side of the base plate, wherein a refractive index of the second film layer is smaller than that of the first film layer and the third film layer.

Optionally, wherein the first film layer, the second film layer and the third film layer are all made of insulating materials, the touch electrodes comprise a first touch electrode and a second touch electrode, and the step of sequentially forming a first film layer, a second film layer and a third film layer on a side of the base plate comprises:

sequentially forming the first film layer, the first touch electrode, the second film layer, the second touch electrode and the third film on the side of the base plate.

Optionally, wherein the touch electrodes comprise a first touch electrode and a second touch electrode, and the manufacturing method further comprises:

sequentially forming a first insulating layer, the first touch electrode, a second insulating layer, the second touch electrode and a third insulating layer on a side, backing onto the first film layer, of the base plate.

Optionally, the manufacturing method further comprising:

sequentially forming a fourth film layer, a fifth film layer and a sixth film layer on a side, backing onto the first film layer, of the base plate, wherein a refractive index of the fifth film layer is smaller than that of the fourth film layer and the sixth film layer.

Optionally, wherein the fourth film layer, the fifth film layer and the sixth film layer are all made of insulating material, the touch electrodes comprise a first touch electrode and a second touch electrode, and the step of sequentially forming a fourth film layer, a fifth film layer and a sixth film layer on a side, backing onto the first film layer, of the base plate comprises:

sequentially forming the fourth film layer, the first touch electrode, the fifth film layer, the second touch electrode and the sixth film layer on the side, backing onto the first film layer, of the base plate.

Optionally, wherein the step of sequentially forming a first film layer, a second film layer and a third film layer on a side of the base plate comprises:

forming the first film layer on one side of the base plate by a DC magnetron sputtering process;

forming the second film layer on a side, backing onto the base plate, of the first film layer by the DC magnetron sputtering process; and forming the third film layer on a side, backing onto the base plate, of the second film layer by the DC magnetron sputtering process.

The above description is only an overview of the technical solution of this disclosure, which can be implemented according to the contents of the specification in order to understand the technical means of this disclosure more clearly, and in order to make the above and other objects, features and advantages of this disclosure more obvious and understandable, the detailed description of the is disclosure will be given below.

BRIEF DESCRIPTION OF THE DRAWINGS

To more clearly explain the technical solutions of the embodiments of the disclosure, drawings required for describing the embodiments of the disclosure will be briefly introduced below. Obviously, the drawings in the following description merely illustrate some embodiments of the disclosure, and those ordinarily skilled in the art may obtain other drawings according to the following ones without creative labor.

DETAILED DESCRIPTION

To make the above purposes, features and advantages of the disclosure clearer and easily understood, the disclosure will be described in further detail below in conjunction with the accompanying drawings and specific implementations. Obviously, the embodiments in the following description are merely illustrative ones, and are not all possible ones of the disclosure. All other embodiments obtained by those ordinarily skilled in the art based on the following ones without creative labor should also fall within the protection scope of the disclosure.

Figure 1:
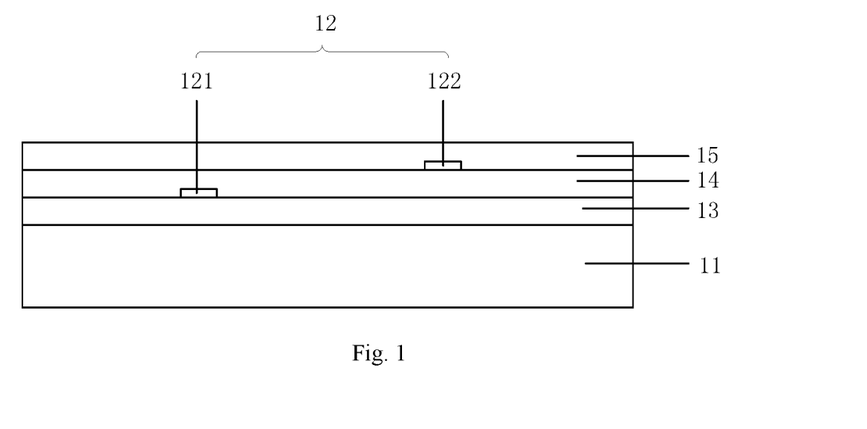
FIG. 1 illustrates a sectional structural view of a first touch substrate provided by one embodiment of the disclosure.
Figure 2:
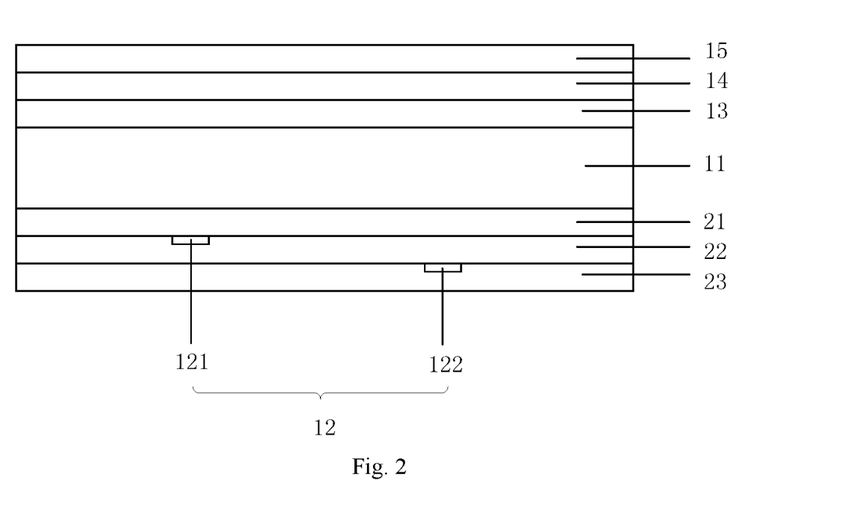
FIG. 2 illustrates a sectional structural view of a second touch substrate provided by one embodiment of the disclosure.
Figure 3:
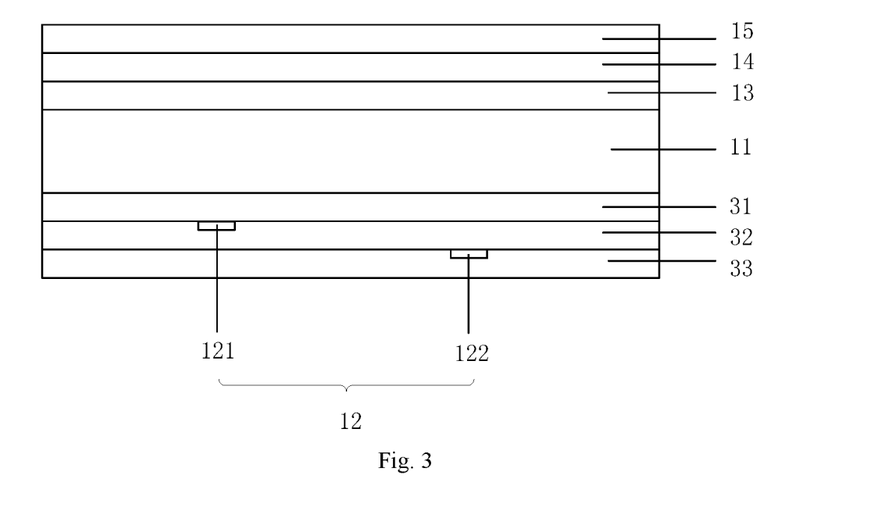
FIG. 3 illustrates a sectional structural view of a third touch substrate provided by one embodiment of the disclosure.

One embodiment of the disclosure provides a touch substrate. As shown in FIG. 1 to FIG. 3, the touch substrate comprises a base plate 11 and touch electrodes 12, wherein a first film layer 13, a second film layer 14 and a third film layer 15 are stacked on one side of the base plate 11, the first film layer 13 is disposed close to the base plate 11, the second film layer 14 is disposed between the first film layer 13 and the third film layer 15, and the refractive index of the second film layer 14 is smaller than that of the first film layer 13 and the third film layer 15.

Wherein, the base plate 11 may be made of materials such as glass, and is used as a base plate and a protective layer of the first film layer 13, the second film layer 14 and the third film layer 15.

A three-layer film system with high and low refractive indexes is formed by the first film layer 13, the second film 14 and the third film layer 15 and is used as a mirror functional layer, and materials of the three-layer film system have different refractive indexes and thicknesses. Wherein, the first film layer 13 and the third film layer 15 are made of a high-refractive index material which may be one of titanium dioxide and niobium oxide. The second film layer 14 is made of a low-refractive index material which may be at least one of silicon dioxide and magnesium fluoride. It should be noted that the first film layer 13 and the third film layer 15 may be made of the same material or different materials.

The principle for realizing mirror refection of the three-layer film system with high and low refractive indexes formed by the first film layer 13, the second film layer 14 and the third film layer 15 is as follows: based on the theory of film interference, light will be refracted and reflected when entering another medium from one medium, light interference will be generated when an optical path difference between multiple refracted light beams meets certain conditions, the interference will be enhanced when the optical path difference between the refracted light beams is an integral multiple of $2\pi$, and reflected light will be increased.

In a specific implementation, the mirror reflectivity of the touch substrate may be controlled by adjusting the thickness of the first film layer 13, the thickness of the second film layer 14 and the thickness of the third film layer 15. In related art, the touch substrate may comprise multiple three-layer film systems, so that the mirror refractivity of the touch substrate may be increased. By adjusting the materials and thicknesses of the film layers in the three-layer film system and the number of the three-layer film systems, the refractive index of the touch substrate provided by this embodiment may reach 30-70%.

For example, when the first film layer 13 and the third film layer 15 are made of titanium dioxide with a refractive index of about 2.3, the second film layer 14 is made of silicon dioxide with a refractive index of about 2.3, and the thickness of the first film layer 13, the thickness of the second film layer 14 and the thickness of the third film layer 15 are 113 nm, 97 nm and 113 nm respectively, a good mirror reflection effect may be realized.

When the first film layer 13 and the third film layer 15 are made of niobium oxide and the second film layer 14 is made of silicon dioxide, a required mirror reflectivity may be obtained by adjusting the thickness of the first film layer 13, the thickness of the second film layer 14 and the thickness of the third film layer 15.

The touch substrate provided by this embodiment has a mirror reflection function by means of alternately stacked film layers with high and low refractive indexes. By bonding the touch substrate provided by this embodiment on a display panel, a touch function, a mirror reflection function and a display function may be realized, the problem of a single function and a poor interaction capacity of existing display products are solved, and people's requirements for information exchange and user experience are met. In addition, the touch substrate provided by this embodiment has a simple manufacturing process and a low cost, thus having great competitiveness in markets and smart home.

In related art, the structural configuration of the touch electrodes 12 may be implemented in different manners.

In one implementation, referring to FIG. 1, the first film layer 13, the second film layer 14 and the third film layer 15 are all made of insulating materials, and the touch electrodes 12 may comprise: a first touch electrode 121 disposed between the first film layer 13 and the second film layer 14, and a second touch electrode 122 disposed between the second film layer 14 and the third film layer 15.

Wherein, the first touch electrode 121 and the second touch electrode 122 are crossed to form metal grids. The first touch electrode 121 is a drive electrode, and the second touch electrode 122 is an induction electrode; or, the first touch electrode 121 is an induction electrode, and the second touch electrode 122 is a drive electrode.

In this implementation, the second film layer 14 is equivalent to an insulating layer between the first touch electrode 121 and the second touch electrode 122, and the first film layer 13 and the third film layer 15 are equivalent to protective layers of the first touch electrode 121 and the second touch electrode 122.

In this implementation, the first touch electrode 121 and the second touch electrode 122 are disposed between the first film layer 13, the second film layer 14 and the third film layer 15, so that the manufacturing process is simple. To avoid interferences of the film layers on the touch function, the first film layer 13, the second film layer 14 and the third film layer 15 are all made of insulating materials.

In a second implementation, referring to FIG. 2, the touch electrodes 12 comprise a first touch electrode 121 and a second touch electrode 122 that are disposed on a side, backing onto the first film layer 13, of the base plate 11, the second touch electrode 122 is disposed on a side, backing onto the base plate 11, of the first touch electrode 121, and the touch substrate may further comprise: a first insulating layer 21 disposed between the base plate 11 and the first touch electrode 121, a second insulating layer 22 disposed between the first touch electrode 121 and the second touch electrode 122, and a third insulating layer 23 disposed on a side, backing onto the base plate 11, of the second touch electrode 122.

Wherein, the first touch electrode 121 and the second touch electrode 122 are crossed on the side, backing onto the first film layer 13, of the base plate 11 to form metal grids. The first touch electrode 121 is a drive electrode, and the second touch electrode 122 is an induction electrode; or, the first touch electrode 121 is an induction electrode, and the second touch electrode 122 is a drive electrode.

In this implementation, the first insulating layer 21 and the third insulating layer 23 are equivalent to protective layers of the first touch electrode 121 and the second touch electrode 122.

In this implementation, the reflection functional layer (the first film layer 13, the second film layer 14 and the third film layer 15) and the touch electrode 12 are disposed on two sides of the base plate 11 respectively, so that interferences of the touch electrodes 12 on the mirror reflection function are avoided, and the mirror reflection effect of the touch substrate is improved.

In a third implementation, referring to FIG. 3, the touch substrate may further comprise: a fourth film layer 31, a fifth film layer 32 and a sixth film layer 33 that are stacked on a side, backing onto the first film layer 13, of the base plate 11, wherein the fourth film layer 31 is disposed close to the base plate 11, the fifth film layer 32 is disposed between the fourth film layer 31 and the sixth film layer 33, and the refractive index of the fifth film layer 32 is smaller than that of the fourth film layer 31 and the sixth film layer 33.

In a specific implementation, the fourth film layer 31, the fifth film layer 32 and the sixth film layer 33 are all made of insulating materials, and the touch electrodes 12 may comprise: a first touch electrode 121 disposed between the fourth film layer 31 and the fifth film layer 32, and a second touch electrode 122 disposed between the fifth film layer 32 and the sixth film layer 33.

Wherein, the first touch electrode 121 and the second touch electrode 122 are crossed on the side, backing onto the first film layer 13, of the base plate 11 to form metal grids. The first touch electrode 121 is a drive electrode, and the second touch electrode 122 is an induction electrode; or, the first touch electrode 121 is an induction electrode, and the second touch electrode 122 is a drive electrode.

In this implementation, the fifth film layer 32 is equivalent to an insulating layer between the first touch electrode 121 and the second touch electrode 122, and the fourth film layer 31 and the sixth film layer 33 are equivalent to protective layers of the first touch electrode 121 and the second touch electrode 122. To avoid interferences of the film layers on the touch function, the fourth film layer 31, the fifth film layer 32 and the sixth film layer 33 are all made of insulating materials.

In this implementation, reflection functional layers, namely a reflection functional layer formed by the first film layer 13, the second film layer 14 and the third film layer 15 and a reflection functional layer formed by the fourth film layer 31, the fifth film layer 32 and the sixth film layer 33, are disposed on two sides of the base plate 11 respectively, so that the mirror refractivity of the touch substrate is increased, the refractivity difference under different wavelengths is decreased, and reflective color casts are avoided.

In a specific implementation, the fourth film layer 31 and the sixth film layer 33 may be made of at least one of titanium dioxide and niobium oxide, and the fifth film layer 32 may be made of at least one of silicon dioxide and magnesium fluoride.

It should be noted that the reflection functional layers on the two sides of the base plate 11 may be made of the same material or different materials. For example, the first film layer 13, the third film layer 15, the fourth film layer 31 and the sixth film layer 33 are made of titanium dioxide, and the second film layer 14 and the fifth film layer 32 are made of silicon dioxide; or, the first film layer 13 and the third film layer 15 are made of niobium oxide, the second film layer 14 is made of silicon dioxide, the fourth film layer 31 and the sixth film layer 33 are made of titanium dioxide, and the fifth film layer 32 is made of magnesium fluoride; or the like.

Figure 4:
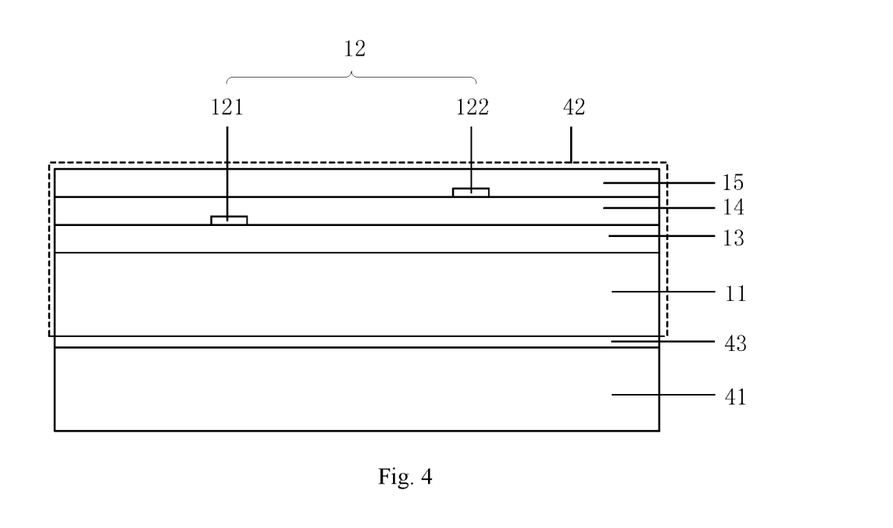
FIG. 4 illustrates a sectional structural view of a first touch displaying device provided by one embodiment of the disclosure.
Figure 5:
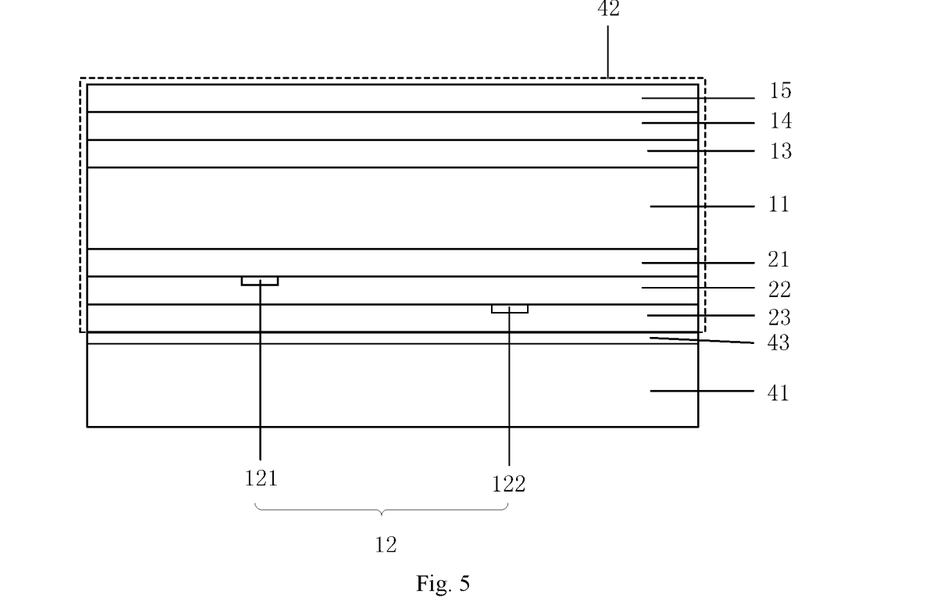
FIG. 5 illustrates a sectional structural view of a second touch displaying device provided by one embodiment of the disclosure.
Figure 6:
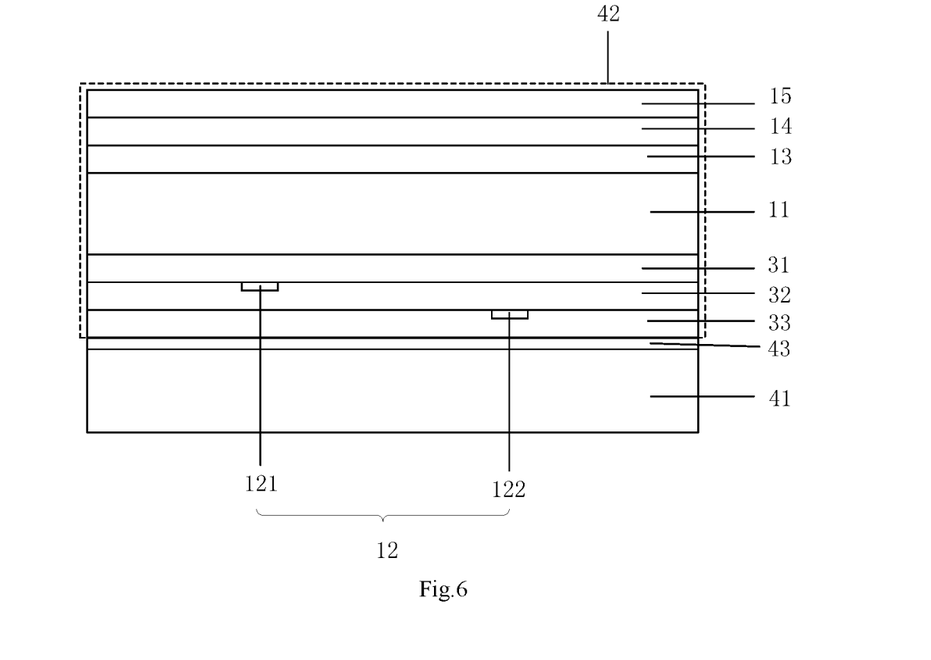
FIG. 6 illustrates a sectional structural view of a third touch displaying device provided by one embodiment of the disclosure.

Another embodiment of the disclosure further provides a touch displaying device. Referring to FIG. 4 to FIG. 6, the touch displaying device comprises a display panel 41, and the touch substrate 42 provided by any one embodiment mentioned above, wherein the touch substrate 42 is located on a light emitting side of the display panel, and the touch substrate 42 and the display panel are bonded with an optically clear adhesive 43.

It should be noted that the touch displaying device in this embodiment may be any products or components with a 2D or 3D display function, such as a display panel, electronic paper, a mobile phone, a tablet personnel computer, a television, a notebook computer, a digital photo frame or a navigator.

Wherein, the optically clear adhesive 43 is a special adhesive for bonding transparent optical elements, is colorless and transparent, has a light transmissivity over 90% and high bonding strength. The optically clear adhesive 43 may be an organic silicone adhesive, an acrylic acid resin adhesive, an unsaturated polyester adhesive, a polyurethane adhesive, an epoxy resin adhesive, or a treating agent, to improve the optical performance or decease the cure shrinkage rate.

In a specific implementation, the display panel 41 may be located on a side, backing onto the base plate 11, of the third film layer 15 or on a side, backing onto the first film layer 13, of the base plate 11. As shown in FIG. 4 to FIG. 6, when the touch substrate 42 and the display panel 41 are bonded with the optically clear adhesive 43, the display panel 41 is disposed on a side, backing onto the first film layer 13, of the base plate 11, so that the mirror reflection effect of the first film layer 13, the second film layer 14 and the third film layer 15 will not be interfered by the optically clear adhesive 43.

Specifically, as shown in FIG. 4, when the first touch electrode 121 of the touch substrate 42 is disposed between the first film layer 13 and the second film layer 14 and the second touch electrode 122 is disposed between the second film layer 14 and the third film layer 15, the display panel 41 is bonded on a side, backing onto the first film layer 13, of the base plate 11.

As shown in FIG. 5, when the first touch electrode 121 of the touch substrate 42 is disposed between the first insulating layer 21 and the second simulating layer 22 and the second touch electrode 122 is disposed between the second insulating layer 22 and the third insulating layer 23, the display panel 41 is bonded to a side, backing onto the base plate 11, of the third insulating layer 23 with the optically clear adhesive 43.

As shown in FIG. 6, when the first touch electrode 121 of the touch substrate 42 is disposed between the fourth film layer 31 and the fifth film layer 32 and the second touch electrode 122 is disposed between the fifth film layer 32 and the sixth film layer 33, the display panel 41 is bonded on a side, backing onto the base plate 11, of the sixth film layer 33.

In this embodiment, the touch substrate and the display panel are bonded with the optically clear adhesive (OCA), so that the touch displaying device has both a mirror function, a touch function and a display function, solves the problem of a single function and a poor interaction capacity of existing display products, and meets people's requirements for information exchange and user experience.

Figure 7:
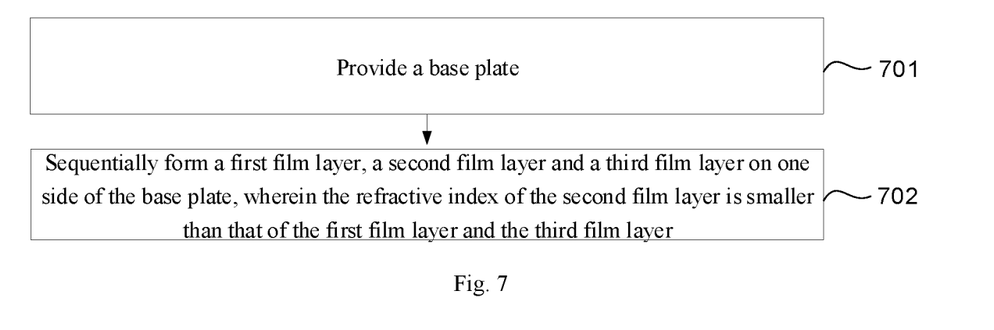
FIG. 7 illustrates a flow diagram of the steps of a manufacturing method of a touch substrate according to one embodiment of the disclosure.

Another embodiment of the disclosure further provides a manufacturing method of a touch substrate. The touch substrate comprises a base plate and touch electrodes. As shown in FIG. 7, the manufacturing method comprises:

Step 701: the base plate is provided.

Step 702: a first film layer, a second film layer and a third film layer are sequentially formed on one side of the base plate, wherein the refractive index of the second film is smaller than that of the first film and the third film.

In a specific implementation, the first film layer is formed on one side of the base plate by a DC magnetron sputtering process, the second film layer is formed on a side, backing onto the base plate, of the first film layer by the DC magnetron sputtering process, and the third film layer is formed on a side, backing onto the base plate, of the second film layer by the DC magnetron sputtering process.

For example, when the first film layer 13 and the second film layer 15 are both made of titanium dioxide, the first film layer 13 and the third film layer 15 may be formed by the DC magnetron sputtering process; and when the second film layer 14 is made of silicon dioxide, the second film layer may be formed by the DC magnetron sputtering process.

It should be noted that the preparation process of the first film layer, the second film layer and the third film layer is not limited to the above process. For example, the first film layer, the second film layer and the third film layer may also be prepared by a vapor deposition process, or the like. The specific preparation process of the film layers may be determined according to actual conditions such as the materials of the film layers, and this embodiment has no limitation to this.

In a specific implementation, the touch electrodes may be manufactured in various manners.

In a first implementation, the first film, layer, the second film layer and the third film layer are all made of insulating materials, the touch electrodes comprise a first touch electrode and a second touch electrode, and Step 702 may specifically comprise the following step: the first film layer, the first touch electrode, the second film, the second touch electrode and the third film layer are sequentially formed on one side of the base plate.

This step may specifically comprise: the first film layer is formed on one side of the base plate; the first touch electrode is formed on a side, backing onto the base plate, of the first film layer; the second film layer is formed on a side, backing onto the base plate, of the first touch electrode; the second touch electrode is formed on a side, backing onto the base plate, of the second film layer; and the third film layer is formed on a side, backing onto the base plate, of the second touch electrode.

In a second implementation, the touch electrodes comprise a first touch electrode and a second touch electrode, and the manufacturing method provided by this embodiment may further comprise the following step: a first insulating layer, the first touch electrode, a second insulating layer, the second touch electrode and a third insulating layer are sequentially formed on a side, backing onto the first film layer, of the base plate. It should be noted that this step may be performed before or after Step 702. The specific performing sequence may be adjusted as actually needed, and this embodiment has no limitation in this aspect.

This step may specifically comprise: the first insulating layer is formed on the side, backing onto the first film layer, of the base plate; the first touch electrode is formed on a side, backing onto the base plate, of the first insulating layer; the second insulating layer is formed on a side, backing onto the base plate, of the first touch electrode; the second touch electrode is formed on a side, backing onto the base plate, of the second insulating layer; and the third insulating layer is formed on a side, backing onto the base plate, of the second touch electrode.

In a third implementation, the manufacturing method provided by this embodiment may further comprise the following step: a fourth film layer, a fifth film layer and a sixth film layer are sequentially formed on a side, backing onto the first film layer, of the base plate, wherein the refractive index of the fifth film layer is smaller than that of the fourth film layer and the sixth film layer. It should be noted that this step may be performed before or after Step 702. The specific performing sequence may be adjusted as actually needed, and this embodiment has no limitation in this aspect.

In a specific implementation, the fourth film layer, the fifth film layer and the sixth film layer are all made of insulating materials, the touch electrodes comprise a first touch electrode and a second touch electrode, and this step may comprise: the fourth film layer, the first touch electrode, the fifth film layer, the second touch electrode and the sixth film layer are sequentially formed on a side, backing onto the first film layer, of the base plate.

This step may specifically comprise: the fourth film layer is formed on the side, backing onto the first film layer, of the base plate; the first touch electrode is formed on a side, backing onto the base plate, of the fourth film layer; the fifth film layer is formed on a side, backing onto the base plate, of the first touch electrode; the second touch electrode is formed on a side, backing onto the base plate, of the fifth touch electrode; and the sixth film layer is formed on a side, backing onto the base plate, of the second touch electrode.

The touch substrate described in any of the above-mentioned embodiment may be manufactured through the manufacturing method provided by this embodiment of the disclosure. Please refer to the description of the above embodiments for the specific structure of the touch substrate manufactured by the manufacturing method.

The embodiments of the disclosure provide a manufacturing method of a touch substrate, a touch substrate, and a touch displaying device. The touch substrate comprises a base plate and touch electrodes, wherein a first film layer, a second film layer and a third film layer are sequentially stacked on one side of the base plate, and the refractive index of the second film layer is smaller than that of the first film layer and the third film layer. According to the technical solution of the disclosure, film layers with high and low refractive indexes are alternately stacked in the touch substrate, so that the touch substrate has a mirror reflection function.

The embodiments in this specification are described progressively, the differences from other embodiments are emphatically stated in each embodiment, and the similarities of these embodiments may be cross-referenced.

Finally, it should be noted that relational terms such as "first" and "second" in this specification are merely used to distinguish one entity or operation from the other one, and do not definitely indicate or imply that these entities or operations have any actual relations or sequences. In addition, the term "comprise" or "include" or other variations are intended to refer to non-exclusive inclusion, so that a process, method, article or device comprising a series of elements not only comprises these elements listed, but also comprises other elements that are not clearly listed, or inherent elements of the process, method, article or device. Unless otherwise clearly specified, an element defined by the expression "comprise a" shall not exclusive of other identical elements in a process, method, article or device comprising said element.

The manufacturing method of a touch substrate, the touch substrate, and the touch displaying device provided by the disclosure are introduced in detail above, specific examples are used in this specification to expound the principle and implementation of the disclosure, and the description of the above embodiments is merely used to assist those skilled in the art in understanding the method and core concept thereof of the disclosure. In addition, those ordinarily skilled in the art can make changes to the specific implementation and disclosure scope based on the concept of the disclosure. So, the contents of the specification should not be construed as limitations of the disclosure.

The invention claimed is:

1. A touch substrate, comprising a base plate and touch electrodes;
    wherein, a first film layer, a second film layer and a third film layer are stacked on a side of the base plate, the first film layer is disposed close to the base plate, the second film layer is disposed between the first film layer and the third film layer, and a refractive index of the second film layer is smaller than that of the first film layer and the third film layer;
    wherein the touch electrodes comprise a first touch electrode and a second touch electrode that are disposed on a side, backing onto the first film layer, of the base plate, the second touch electrode is disposed on a side, backing onto the base plate, of the first touch electrode; the touch substrate further comprises:
    a first insulating layer disposed between the base plate and the first touch electrode;
    a second insulating layer disposed between the first touch electrode and the second touch electrode; and
    a third insulating layer disposed on a side, backing onto the base plate, of the second touch electrode.

2. A touch substrate, comprising a base plate and touch electrodes;
    wherein, a first film layer, a second film layer and a third film layer are stacked on a side of the base plate, the first film layer is disposed close to the base plate, the second film layer is disposed between the first film layer and the third film layer, and a refractive index of the second film layer is smaller than that of the first film layer and the third film layer;
    wherein the touch substrate further comprises: a fourth film layer, a fifth film layer and a sixth film layer that are stacked on a side, backing onto the first film layer, of the base plate, wherein the fourth film layer is disposed close to the base plate, the fifth film layer is disposed between the fourth film layer and the sixth film layer, and a refractive index of the fifth film layer is smaller than that of the fourth film layer and the sixth film layer.

3. The touch substrate according to claim 2, wherein the fourth film layer, the fifth film layer and the sixth film layer are all made of insulating materials, and the touch electrodes comprise: a first touch electrode disposed between the fifth film layer and the fifth film layer, and a second touch electrode disposed between the fifth film layer and the sixth film layer.

4. The touch substrate according to claim 1, wherein the first film layer and the third film layer are made of at least one of titanium dioxide and niobium oxide, and the second film layer is made of at least one of silicon dioxide and magnesium fluoride.

5. The touch substrate according to claim 4, wherein the first film layer and the third film layer are made of titanium dioxide, the second film layer is made of silicon dioxide, the thickness of the first film layer and the thickness of the third film layer are 113 nm, the thickness of the second film layer is 97 nm.

6. A touch displaying device, comprising a display panel, and the touch substrate according to claim 1, wherein the touch substrate is located on a light emitting side of the display panel.

7. The touch displaying device according to claim 6, wherein the display panel is located on the side, backing onto the first film layer, of the base plate.

8. The touch displaying device according to claim 6, wherein the touch substrate and the display panel are bonded with an optically clear adhesive.

9. A manufacturing method of a touch substrate, wherein the touch substrate comprises a base plate and touch electrodes, and the manufacturing method comprises:

provided the base plate; and sequentially forming a first film layer, a second film layer and a third film layer on a side of the base plate, wherein a refractive index of the second film layer is smaller than that of the first film layer and the third film layer;

wherein the touch electrodes comprise a first touch electrode and a second touch electrode, and the manufacturing method further comprises:

sequentially forming a first insulating layer, the first touch electrode, a second insulating layer, the second touch electrode and a third insulating layer on a side, backing onto the first film layer, of the base plate.

10. The manufacturing method according to claim 9, further comprising:

sequentially forming a fourth film layer, a fifth film layer and a sixth film layer on a side, backing onto the first film layer, of the base plate, wherein a refractive index of the fifth film layer is smaller than that of the fourth film layer and the sixth film layer.

11. The manufacturing method according to claim 9, wherein the step of sequentially forming a first film layer, a second film layer and a third film layer on a side of the base plate comprises:

forming the first film layer on one side of the base plate by a DC magnetron sputtering process;

forming the second film layer on a side, backing onto the base plate, of the first film layer by the DC magnetron sputtering process; and forming the third film layer on a side, backing onto the base plate, of the second film layer by the DC magnetron sputtering process.

\* \* \* \* \*

UNITED STATES PATENT AND TRADEMARK OFFICE
CERTIFICATE OF CORRECTION

| | | |
|---|---|---|
| PATENT NO. | : 11,681,407 B2 | Page 1 of 1 |
| APPLICATION NO. | : 17/350192 | |
| DATED | : June 20, 2023 | |
| INVENTOR(S) | : Xia Shi et al. | |

It is certified that error appears in the above-identified patent and that said Letters Patent is hereby corrected as shown below:

On the Title Page

Item (73) Change:
Assignee: WUHAN BOE OPTOELECTRONICS CO., LTD.
To be:
Assignee: WUHAN BOE OPTOELECTRONICS TECHNOLOGY CO., LTD.

Signed and Sealed this
Seventeenth Day of October, 2023

Katherine Kelly Vidal
*Director of the United States Patent and Trademark Office*